Sept. 2, 1952          D. T. BALDWIN          2,609,179

TOOL

Filed May 27, 1948

Donald T. Baldwin
INVENTOR.

Patented Sept. 2, 1952

2,609,179

UNITED STATES PATENT OFFICE 2,609,179

TOOL

Donald T. Baldwin, Lincoln, Ill.

Application May 27, 1948, Serial No. 29,540

6 Claims. (Cl. 254—100)

This invention relates to automobile repair tools for use in loosening the wrist pin of the connecting rod on the crankshaft of motor vehicles.

A primary object of the invention is to remove wrist pins from connecting rods without the necessity for removing the head and other parts, thereby effecting a considerable saving in time and labor, as well as avoiding the necessity for replacing worn parts, such as rings and gaskets.

Features of the invention reside in attaching the tool to the crank throw shaft on a connecting rod and wrist pin studs, and by rotation thereof, loosen the wrist pin clamping means to permit removal thereof.

These and other objects will appear from the following description taken in connection with the drawings.

Referring to the drawings.

Figure 1:
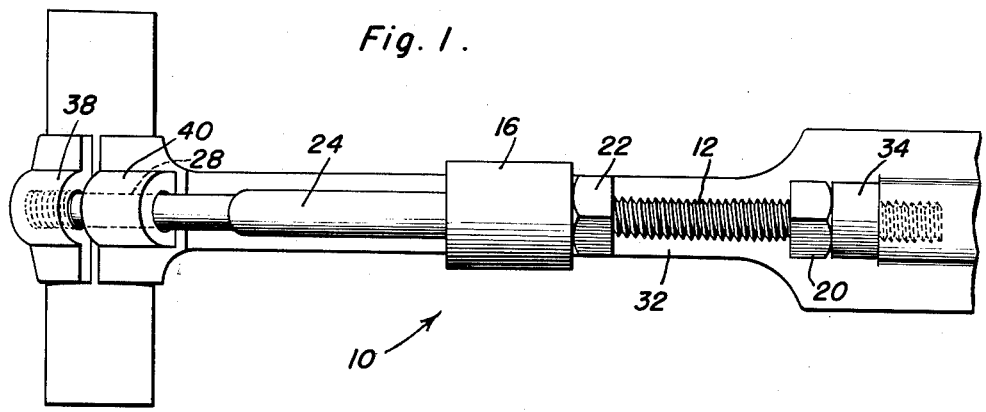
Figure 1 is a top plan view of the invention as applied to a connecting rod of a motor vehicle.

Orthodox methods of removing the wrist pin from the connecting rod of a motor involve dropping the pan and removing the bottom half of the connecting rod and removing the head and rocker arm assembly before the wrist pin can be removed. As a result, considerable labor is expended in this sample operation, and includes the necessity for purchasing new head sets, piston rings and gaskets. The instant invention has been developed to overcome these difficulties, and as a result, as much as five hours have been saved with each job, as well as eliminating the cost of certain parts.

Referring to the figures, the invention is indicated generally by numeral 10 and includes a threaded anchor bolt 12, bolt 12 being headed at 14. An annular socket or cylinder 16 is apertured at 18 on the closed bottom thereof to retain head 14 in engagement therewith. A threaded adjusting nut 20 is mounted at one end on bolt 12, for a purpose soon to be apparent, and a lock nut 22 is retained on the opposite extreme of anchor stud or bolt 12 adjacent head 14 to hold cylinder 16 in position.

A push rod or top pin 24, angularly headed at 26, is angularly placed within cylinder 16, head 26 abutting head 14 of bolt 12. Push rod 24 includes a reduced shank 28 extending axially from the free end thereof and terminating in a threaded extremity 30, for a purpose soon to be described.

Figure 2:
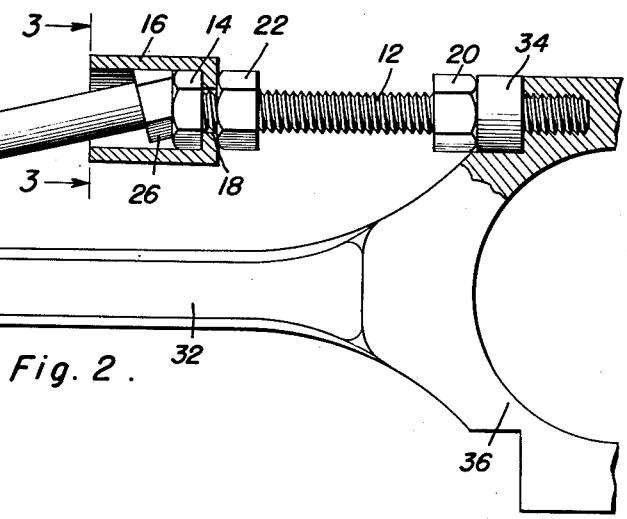
Figure 2 is a side elevation of the invention shown in Figure 1.
Figure 3:
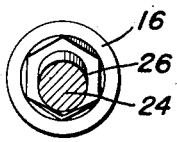
Figure 3 is a vertical, sectional view and is taken substantially on line 3—3 of Figure 2.

In use, the pin removing tool 10 is inserted in operating relation with a connecting rod 32 of a motor vehicle. Anchor bolt 12 is secured in bearing 34 extending from crank throw shaft 36, and shank 28 extends through wrist pin clamp jaw members 38 and 40. Shank 28 extends through bore 42 of clamp half 40 and is threadedly received in similar bore 44 of clamp member 38. A wrist pin 46 is tightly held by the clamping relation of members 38 and 40. Nut 22 is rotated to engage cylinder 16 at one end thereof in locking relation. Nut 20 is rotated so that anchor bolt 12 moves readily to the left, thereby applying force to socket 16 which in turn moves push rod 24 axially to the left causing clamp member 38 to separate from clamp member 40 in the manner clearly shown in Figure 2. Wrist pin 46 is thereby loosened and may be readily removed. Reverse rotation of lock nut 20 on anchor stud 12 relieves the outward thrust on top pin 24 and the tool may be readily removed.

Thus, it is readily apparent that the objects of the invention have been achieved with considerable saving in time and labor due to the ability to remove wrist pin 46 without the necessity for removing any other mechanical part.

Obviously, the tool is adapted for various uses, other than those described above.

While there is shown and described a preferred embodiment of the invention, it is understood that it is not to be limited to the details of construction disclosed, since it is apparent to one skilled in the art that the same may be varied without departing from the spirit of the invention.

Having described the invention, what is claimed as new is:

1. A tool for loosening the wrist pin of a connecting rod on a motor vehicle, consisting of an anchor bolt adapted to bear against the crank shaft journal, a push rod secured to one lug of a wrist pin clamp, a hollow cylinder receiving the free ends of said bolt and rod, and a rotatable adjusting nut mounted on said anchor bolt whereby on rotation thereof the wrist pin clamps are forced apart and permit easy removal of the wrist pin.

2. The combination of claim 1, wherein said bolt and rod are headed and in abutting relation, so that movement of the anchor bolt forces the rod member to separate the wrist pin clamp.

3. A tool for spreading a split wrist pin accommodating boss at the outer end of a connecting rod to enable a wrist pin readily to be removed from or to be inserted into said boss, said boss having inner and outer lugs projecting therefrom inwardly and outwardly of the split thereof, respectively, said lugs having aligned bolt-accommodating holes of which the one in the outer lug is threaded, and said connecting rod including at its inner end a bearing formation having a bolt hole therein, said tool comprising a rod element to have its outer end inserted through the hole in said inner lug and to be engaged in the hole in said outer lug to exert a pushing force upon said outer lug to spread the boss, a nut to be engaged with said bearing element so as to be held by the latter against inward movement relative to said rod, and a bolt to extend through the bolt hole in said bearing element and to be threaded through said nut into engagement with the inner end of said rod element so as to react from said nut to urge said rod element outwardly to spread said boss.

4. A tool for spreading a split wrist pin accommodating boss at the outer end of a connecting rod to enable a wrist pin readily to be removed from or to be inserted into said boss, said boss having inner and outer lugs projecting therefrom inwardly and outwardly of the split thereof, respectively, said lugs having aligned bolt-accommodating holes of which the one in the outer lug is threaded, and said connecting rod including at its inner end a bearing formation having a bolt hole therein, said tool comprising a rod element to have its outer end inserted through the hole in said inner lug and to be engaged in said outer lug to exert a pushing force upon said outer lug to spread said boss, a nut to be engaged with said bearing element so as to be held by the latter against inward movement relative to said rod, and a bolt to extend through the bolt hole in said bearing element and to be threaded through said nut into engagement with the inner end of said rod element so as to react from said nut to urge said rod element outwardly to spread said boss, and a telescopic connection between the inner end of the rod element and an outer end portion of the bolt.

5. A tool for spreading a split wrist pin accommodating boss at the outer end of a connecting rod to enable a wrist pin readily to be removed from or to be inserted into said boss, said boss having inner and outer lugs projecting therefrom inwardly and outwardly of the split thereof, respectively, said lugs having aligned bolt-accommodating holes of which the one in the outer lug is threaded, and said connecting rod including at its inner end a bearing formation having a holt hole therein, said tool comprising a rod element to have its outer end inserted through the hole in said inner lug and to be engaged in the hole in said outer lug to exert a pushing force upon said outer lug to spread the boss, a bolt to be disposed in the bolt hole of the bearing element at the inner end of the connecting rod, a nut to be threaded on said bolt against said bearing element to hold said bolt against inward movement relative to said bearing element, and a second nut to be engaged on and threaded outwardly along said bolt and to bear directly against the inner end of said rod element to urge the latter outwardly and thus effect spreading of said boss.

6. A tool for spreading a split wrist pin accommodating boss at the outer end of a connecting rod to enable a wrist pin readily to be removed from or to be inserted into said boss, said boss having inner and outer lugs projecting therefrom inwardly and outwardly of the split thereof, respectively, said lugs having aligned bolt-accommodating holes of which the one in the outer lug is threaded, and said connecting rod including at its inner end a bearing formation having a bolt hole therein, said tool comprising a rod element to have its outer end inserted through the hole in said inner lug and to be engaged in the hole in said outer lug to exert a pushing force upon said outer lug to spread the boss, a bolt to be disposed in the bolt hole of the bearing element at the inner end of the connecting rod, a nut to be threaded on said bolt against said bearing element to hold said bolt against inward movement relative to said bearing element, and a second nut to be engaged on and threaded outwardly along said bolt and to bear directly against the inner end of said rod element to urge the latter outwardly and thus effect spreading of said boss, and a telescopic connection between the inner end of the rod element and an outer end portion of the bolt.

DONALD T. BALDWIN.

REFERENCES CITED

The following references are of record in the file of this patent:

UNITED STATES PATENTS

| Number | Name | Date |
| --- | --- | --- |
| 2,331,683 | Hendricks | Oct. 12, 1943 |
| 2,387,430 | Daubs | Oct. 23, 1945 |